Dec. 31, 1935. T. POHL ET AL Re. 19,802

ABRADING MATERIAL AND PROCESS FOR PREPARING THE SAME

Original Filed Feb. 20, 1932

Inventors
Theodor Pohl,
Josef Schneider,
By Bailey & Parsons
Attorneys

Reissued Dec. 31, 1935

Re. 19,802

UNITED STATES PATENT OFFICE 19,802

ABRADING MATERIAL AND PROCESS FOR PREPARING THE SAME

Theodor Pohl, Frankfort-on-the-Main, and Josef Schneider, Oberursel-on-the-Taunus, Germany Original No. 1,986,849, dated January 8, 1935, Serial No. 594,304, February 20, 1932. Application for reissue April 18, 1935, Serial No. 17,080. In Germany February 26, 1931

6 Claims. (Cl. 51—280)

This invention relates to abrading materials for use in abrading and grinding operations.

It has been heretofore proposed to form an abrading and grinding composition of finely divided portions of relatively hard materials held together in a suitable working form by a binding agent. Among the abrading materials frequently employed for such purposes are silicium carbide, corundum, and finely-ground glass. As binders for the abrading material self-hardening materials such as gypsum, cement, low-melting glass and similar substances have been used and also materials which are not self-hardening themselves but which may be hardened by heating, drying or suitable chemical treatment such as, for example, dextrin, glue, albumins, caseins and similar materials. In certain cases, it has been found desirable and advantageous to use the combination of two or more of the binding agents. The selection of the particular grinding material or binding material or a combination thereof is governed by the use for which the abrading material is intended and to a large extent by the nature of the work to be treated.

In the finished product heretofore known, the hard particles of the abrading material are compactly held together by the binding materials, the mass containing very irregular and minute pores or spaces which unavoidably developed during the preparation thereof. The abrading composition has been made to assume many different forms, such as slabs, sticks and wheels in which it may be conveniently utilized.

Prior abrading compositions and devices, formed of the materials and in the general manner described, have had the serious disadvantage that after a comparatively short use the attacking power or the abrading effect on the work being treated rapidly diminishes. This diminution of the abrasive action has been due to the fact that the fine pores which exist within the composition mass become clogged and covered with the material removed from the work treated and, as a consequence, the surface of the abrading material tends to become smooth and ineffective.

A further disadvantage of prior abrading compositions and devices of the character referred to is that when contacted with work at high speeds they have greatly heated to such an extent that the work has been damaged by burning or melting.

A general object of the present invention is to provide an abrasive substance in which the disadvantages referred to are completely overcome.

A further object of the invention is to provide an abrasive substance which will maintain its cutting and abrading efficiency throughout its life and continuously present an attacking or cutting surface of predetermined power and effectiveness.

A still further object of the invention is to provide an abrading material which, when formed into grinding discs or wheels, will become very much less heated when rotated at high speeds than grinding discs heretofore known, and which will thereby avoid damage to the material being worked, such as by burning or melting.

Another object of the invention is to provide a grinding material and articles formed thereof which has a comparatively coarse cellular formation and in which the particles are spaced a greater distance apart than in those heretofore known.

Still another feature of the invention resides in an improved and novel method for producing abrasive materials and articles made therefrom.

These and other features of the invention, and the novel method referred to, will be more fully apparent from the following specification when read in conjunction with the annexed drawing and will be particularly pointed out in the appended claims.

Figure 1:
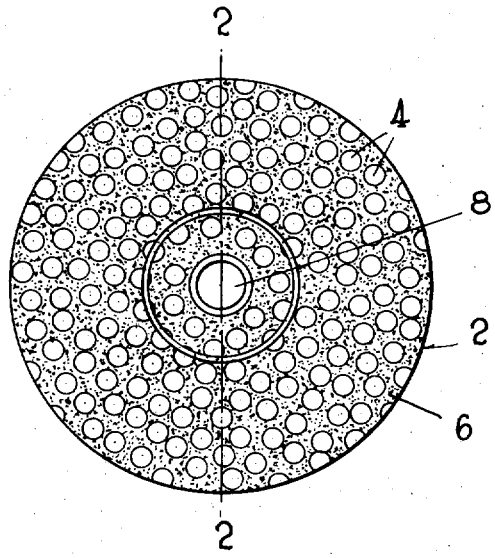
Fig. 1 is a side view of an abrading disc formed from the abrading material of this invention.

The invention contemplates the production of an abrasive composition which is characterized by a pronounced cellular or porous structure of considerable coarseness. The cellular formation may be obtained by any one of several suggested methods. One of these methods may be generally described as a gas-liberation operation. To the binding material or materials used to unite the particles of the abrading material or to the mixture of the abrading and binding materials are added compounds which act either in conjunction with the liquid employed to render the mass plastic or under the influence of other materials to liberate gases. Suitable compounds which may be added to the abrasive-binder plastic mass for this purpose are aluminum, calcium, magnesum or alloys of these metals, zinc, calcium carbide and bicarbonate. If necessary, certain alkali compounds may also be added to stimulate gas liberation.

A satisfactory method of obtaining the desired coarse porous cellular structure is to add oxygen bearing compounds such as hydrogen peroxide ($H_2O_2$) to the mass of grinding and binding materials. The hydrogen peroxide may be used in either liquid or solid form. Liberation of the oxygen may be stimulated by the addition of a catalyst, such as manganese dioxide or copper powder, or by suitable chemicals or by heat. An important advantage of this particular process is that it is possible through it to regulate, or at least greatly influence, the size of the pores or cells which are formed.

As examples of the described method, the following have yielded highly satisfactory results:

*Example 1*

Nine kg. of powdered glass of suitable fineness are mixed in a dry condition with 1 kg. of dextrin and sufficient water is added to bring the mixture into a plastic condition. While slowly stirring, 300 cm.$^3$ of 30% hydrogen peroxide ($H_2O_2$) are added to this mass. A suitable catalyzer, such as manganese dioxide or copper powder, is then added to regulate the development and release of gas. If desired, manganese sulphate might also be stirred into the plastic mass and, after the addition of the hydrogen peroxide, gas may be developed by small quantities of ammonia. Thereafter, the resulting mass is poured into forms of the desired shape and is dried, hardened and finished.

*Example 2*

To a heated solution of two kg. glue (4 parts glue=3 parts water), 400 cm.$^3$ of 30% hydrogen peroxide ($H_2O_2$) are rapidly added. The resulting mass is intimately mixed, by stirring, with the catalyzer which may be a mixture of 30 g. of finely pulverized manganese dioxide in 300 cm.$^3$ of water. As the development of oxygen begins, the mass is converted into a tough batch into which is added 9 kg. of powdered glass which has been moistened with water and preheated, the addition taking place during stirring. Thereafter, the mass is poured into suitable forms. After cooling, it is removed from the forms, dried and solidified.

*Example 3*

Five kg. of a very finely pulverized glass having an extremely low melting point is stirred with 2.3 litres of water and 150 cm.$^3$ of 30% hydrogen peroxide ($H_2O_2$) and 0.5 litres of a 2% soap solution. As a catalyzer, 25 kg. of manganese dioxide dissolved in 250 cm.$^3$ of water are added. The addition of the catalyzer causes the development and release of the gas which results in an enlargement of the mass. While the mass is being stirred, 5 kg. of a grinding material such as ground glass of an extremely high melting point or silicon carbide are added. The resulting mixture is poured into suitable forms and dried. It is then heated until the low melting components of the mixture have sintered.

*Example 4*

A solution containing 2 kg. of glue is prepared, having the proportions of 2 parts glue to 3 parts water. The solution is heated and 100 cm.$^3$ of 30% hydrogen peroxide ($H_2O_2$) are added thereto. While this mixture is being stirred, 5 kg. of crystal glass powder which has been moistened with 750 cm.$^3$ of water are added. To stimulate the development and release of gas, 25 g. of manganese dioxide suspended in 250 cm.$^3$ of water are employed. When the gas development has begun, 5 kg. of a grinding material such as powdered carborundum, or corundum, are stirred into the mass. While still warm, the mass is poured into suitable forms, dried and thereafter heated until the glass powder, acting as a binder, has sintered so as to form a rigid grinding body.

*Example 5*

To a heated solution of two kg. glue (4 parts glue=3 parts water), 400 cm.$^3$ of 30% hydrogen peroxide ($H_2O_2$) are rapidly added. The resulting mass is intimately mixed, by stirring, with the catalyzer which may be a mixture of 30 g. of finely pulverized manganese dioxide in 300 cm.$^3$ of water. As the development of oxygen begins, the mass is converted into a tough batch into which is added 9 kg. of powdered glass and 900 g. of solid bakelite powder which has been previously moistened with 1 litre of water. The batch is thoroughly mixed and thereafter poured into suitable forms. After drying, the resulting product is saturated with a solution of bakelite in acetone. After being further dried, the product is preferably heated under pressure to between 150–170° C.

*Example 6*

One thousand g. of a suitable grinding material, such as glass powder, are mixed and stirred with 150 g. of liquid bakelite. Into this mass, 5 cm.$^3$ of hydrogen peroxide (30%), diluted with 10 cm.$^3$ of acetone, are stirred. 5 g. of manganese dioxide dissolved in 25 cm.$^3$ of acetone is then added and stirred into the mixture. The resulting mass is poured into forms where it is allowed to rise. The mass is thereafter dried and hardened.

*Example 7*

A solution is made of 2 kg. of glue in the proportion of 4 parts of glue to 3 parts of water. In this solution is thoroughly mixed 9 kg. of finely ground emery which has been previously moistened with 1 litre of water. When a uniform mixture has been obtained, 400 cm.$^3$ of hydrogen peroxide solution (30%) are added and well stirred therewith. A mixture of 30 g. of manganese dioxide in 300 g. of water is next added. After swelling of the mass due to the released oxygen, the mass is placed into suitable forms. While still in a wet condition, the formed product is subjected to formaldehyde vapors which causes solidification. The product is then dried. Thereafter, the product may be further treated by dipping into solutions of resins or caoutchouc or a bakelite-acetone solution. After a final drying operation, the product is ready for use.

The coarse cellular or porous formation of the character contemplated by the invention may also be obtained by mechanically stirring or beating a plastic mixture of the grinding and binding materials in a violent manner. The result of this agitation is the production of a light foam-like mass which, upon hardening, will have the desired cellular formation. This treatment may be advantageously improved by the addition of foam-forming compounds.

*Example 8*

Nine kg. of glass frits which have been moistened with approximately 1.4 litres of water are thoroughly stirred with a solution of 2 kg. of glue, containing 4 parts of glue and 3 parts of water. Into this powdered glass-glue mixture, 4 kg. of kaolin foam are stirred, the kaolin foam used being produced as follows: 4 kg. of kaolin are stirred into a uniform solution with 3.2 kg. of water. To this solution is added a mixture of 1000 g. of kaolin or clay and 40 g. of aluminum powder which have been dispersed in 1000 cm.³ of water, and the whole is then thoroughly stirred. 800 cm.³ of a 5% soap solution are placed in the mixture. Subsequently 2400 cm.³ of a solution containing 120 g. of sodium hydrate are added.

The resulting mass obtained by mixing the kaolin foam with the glass-glue mixture is placed in forms and subsequently solidified and tempered by treating with a formaldehyde solution or with formaldehyde vapors. If desired the product may then also be impregnated with a rubber or bakelite solution.

*Example 9*

A solution is prepared by dissolving 60 g. of glue in 240 g. of water. The solution is beaten and stirred for a considerable time until a viscous foam has been produced. Into this glue foam are stirred 450 g. of carborundum powder of selected and suitable grains, the carborundum powder being slightly moistened with 20 g. of water. The resulting mass is poured into suitable forms and subsequently hardened.

The cellular structure in the abrading composition may also be produced by the addition, and subsequent removal, of solid bodies. According to this method of treatment, solid bodies, such as lumps of sugar, sodium chloride, cork or other organic materials, having dimensions corresponding to those of the cells to be produced are added to and thoroughly mixed with the plastic mass which comprises the abrading and grinding materials. After the mass has solidified, either temporarily or finally, the added solid bodies are removed by appropriate treatment and leave the empty cells or pores throughout the mass. The method of removal will of course depend upon the nature of the solid material employed, and also to some extent upon the binding materials used. Thus, if sodium chloride and sugar are employed as the solid to form the cells, removal is effected by lixiviation with water. Saw dust would be removed by burning. Melting and evaporation may also be resorted to for removing solids of other types.

*Example 10*

Three hundred and thirty g. of silicium carbide (with a volume of about 0.01 mm.³) are covered with approximately 60 g. of a solution of bakelite so that the carborundum grains become impregnated with the solution. The prepared carborundum grains are then dried and sifted. Into a ring form of approximately 160 mm. diameter, are placed 500 g. of sugar pearls having a diameter of 4 mm., and the spaces between the sugar pearls are carefully filled with the prepared silicium carbide. After the forms are filled in this manner, they are heated for about two hours at 150° C. Thereafter, the solidified contents are moved from the forms and cooled. The sugar pearls are then loosened from the mass with hot water, the product dried and subsequently impregnated with liquid bakelite. The product is then hardened.

As indicated in the various examples, the abrading mixture may be subjected to further finishing treatments following the cell-producing steps. It is frequently advantageous to impregnate or saturate the cellular material with such substances as lac, resins, artificial and synthetic resins, such as artificial resin known under the trade name bakelite, caoutchouc dispersions, caoutchouc solutions and glue, shellac or water glass. As a final step, the material is dried, heated, hardened, chemically, treated or vulcanized in accordance with the needs of the material or the nature of the product desired.

The abrading compounds produced by the invention are interspersed with substantial and preferably uniformly formed cells or holes which are separated from each other by walls of the abrading mixture. The cells or holes can be of various shapes, such as, ball-like, cylindrical, etc., and the size may vary within a wide range. The form and size of the cells are controlled to a considerable extent by the particular abrading material which is used, the binding material, and by the kind of work to which the material is to be subjected. The desired size and form and the relation thereof to the materials used can be readily ascertained by tests.

Whatever the method by which they are formed, and regardless of the size thereof which may vary through a considerable range, it is important that the size of the pores or cells should be either equal to or a multiple of the size of the particles of abrading material used. If this relationship between the cells and the abrading substance is observed, the material removed from the work being treated and the loosened and broken particles of the abrading material are permitted to escape from the cells and thus leave the latter free and unclogged. As a result, the abrading material at all times presents an active surface consisting of sharp and relatively narrow cutting edges formed by the walls of the cells or pores. It is an essential feature of the invention that the pores or hollow spaces should be of greater size than the grains of the abrading material, and that these pores should comprise 50% or more of the total volume of the grinding body. In accordance with this invention grinding bodies have been formed in which the hollow spaces amount to from 60% to 80% of the total volume of the grinding body or of the part of the grinding body which is interspersed with hollow spaces. It is also of advantage in many cases that all of the hollow spaces be approximately of the same size. The use of such grinding wheels has given very unusual results. In the past the tendency throughout the industry has been to reduce the porosity of the grinding wheels. It has been supposed that a grinding wheel of high porosity would be so lacking in strength that it would practically be useless. The principal considerations have been to obtain a strong wheel containing a large amount of abrasive. For example, it has been thought hitherto that a porosity of 47% was an absolute upper limit. It has also been absolutely impossible to operate grinding wheels at very high speeds. The usual grinding wheels with ceramic binders would break apart and be destroyed if their peripheral speed reached at the most around forty meters per second.

Grinding bodies made according to this invention, however, may be operated at high speeds, even up to ninety to one hundred meters per second. Operation at such speeds has very definite advantages. Moreover, the amount of material necessary to construct grinding bodies according to the present invention is considerably less. We have found that we can use 40% less abrasive than the normal grinding wheel of the same size. The wheels are lighter and, therefore, require less power for their operation. In a great many instances, they operate much more satisfactorily and efficiently and will grind more rapidly than the old style of wheel, while wearing away of the grinding body itself takes place at a very slow rate. Moreover, grinding wheels made in accordance with our invention may be used for cutting many objects which it was heretofore impossible to grind. For example, wood may be cut by wheels of this type and the addition of water during such cutting is, as a rule, unnecessary.

Figure 2:
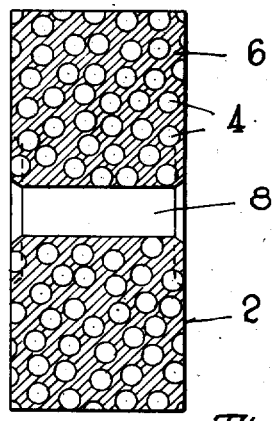
Fig. 2 is a section along line 2—2 of Fig. 1.

The appended drawing illustrate certain specific forms of cellular formation which may be given to the abrading compositions, the material in such instance being illustrated in the form of a grinding disc. According to Figs. 1 and 2, the grinding disc 2 has a honey-comb formation wherein the hollow cells 4 are uniformly distributed throughout the entire disc, the cells being surrounded by the comparatively thin walls 6 of the selected abrading and binding material. The cells extend from the periphery of the disc inwardly to the axis opening 8 and from one side to the other. The cells are generally cylindrical or ball-shaped.

The cells of the discs may be formed by any of the methods hereinbefore described.

An abraiding disc formed in accordance with the present invention has many advantages over previous grinding discs. As the abrading compounds wear away, new hollow cells continuously open. In this manner, new and fresh cutting edges are continuously presented. As the hollow spaces or cells are substantially large as compared with the grinding particles removed from the material being treated, they do not become clogged but, on the contrary, are always free of extraneous matter. The grinding efficiency or attacking power of the disc does not diminish with use.

With an abrading device constructed in accordance with the invention it is possible to grind and abrade many materials which heretofore could be treated only by means of fresh sand, or emery paper, or cloth. Thus, it is now possible to grind effectively materials such as wood, cork, and leather. Other materials which may be effectively treated by the abraiding device of this invention are, ebonite, galalith, celluloid, glass ceramic materials, such as chamottes, porcelain and the like, molten magnesia, aluminum oxide, and metals and metal alloys such as, brass, bronze, steel and the like.

Having thus described the invention, what we claim as new and desire to secure by Letters Patent of the United States is:

1. A rigid grinding body consisting of abrading material and a rigid binding medium, and having therein pores of greater size than the grains of the abrading material, said pores comprising 50% or more of the total volume of the grinding body.

2. A rigid grinding body consisting of abrasive material and a rigid binding medium which, by being uniformly interspersed with hollow spaces, has a cellular structure, and the number and size of the hollow spaces is such that the total volume of the hollow spaces, inclusive of any pores which may be present in the walls, is 50% or more of the total volume of the grinding body or the part of the grinding body which is interspersed by hollow spaces, and the average size of the hollow spaces is at least equal to the average size of the grains of abrasive material.

3. Grinding body according to claim 2, in which the total volume of the hollow spaces amounts to 60 to 80% of the total volume of the grinding body or of the part of the grinding body interspersed by artificial hollow spaces.

4. Grinding body according to claim 2, in which the size of the hollow spaces is several times or many times the size of the grinding grains present.

5. Grinding body according to claim 2, in which the hollow spaces with which the grinding body is interspersed are of the same or approximately the same size.

6. Grinding body in accordance with claim 2, in which the individual hollow spaces are connected by openings.

THEODOR POHL.
JOSEF SCHNEIDER.